Dec. 24, 1929.  C. J. HOLSLAG  1,740,983
ARC WELDING SYSTEM
Filed Oct. 2, 1926
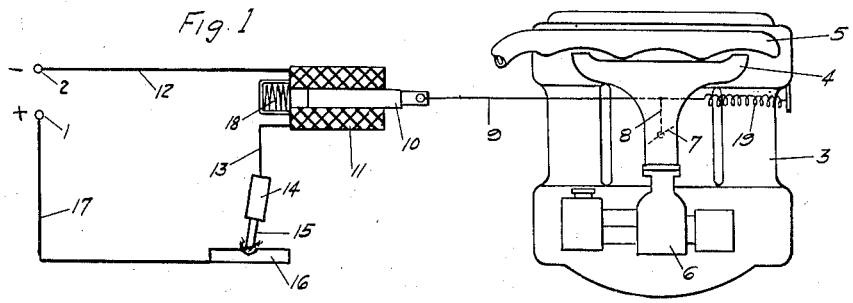
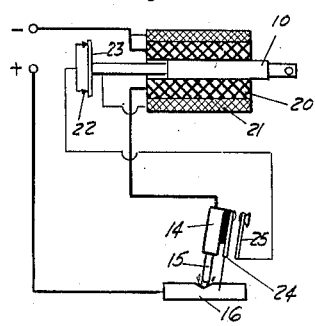
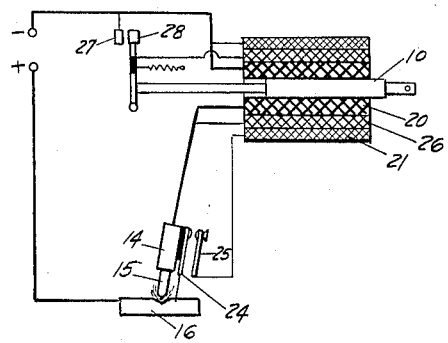
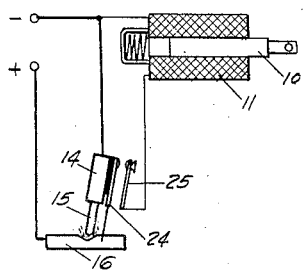
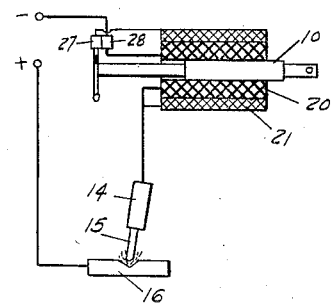
INVENTOR
CLAUDE J. HOLSLAG
BY
A. D. T. Libby
ATTORNEY Patented Dec. 24, 1929

1,740,983

UNITED STATES PATENT OFFICE

CLAUDE J. HOLSLAG, OF EAST ORANGE, NEW JERSEY, ASSIGNOR TO ELECTRIC ARC CUTTING AND WELDING COMPANY, OF NEWARK, NEW JERSEY

ARC-WELDING SYSTEM

Application filed October 2, 1926. Serial No. 139,059.

This invention relates to arc welding systems particularly of the type shown and described in my application Serial Number 90,785, filed February 26th, 1926, in which an internal combustion engine may be used for actuating a generator which either delivers welding current direct, or through a transformer, or other equivalent apparatus.

In such a welding system, it has been the practice in the past to operate the engine with a substantially wide open throttle, so that the generator will be in a position to immediately start welding operations, at any time. It happens, that in arc welding, welding operations are very frequently interrupted, due to the consuming of the electrodes and the time required in putting new electrodes into the holder, and various other reasons, consequently the engine used in such a system is using up considerable fuel, when no work is being done.

It is therefore the principal object of my invention to provide a welding system, in which the engine is throttled or the speed reduced during the "off periods" in welding operations, thereby saving a substantial amount of fuel and oil, which would otherwise be consumed by the internal combustion engine.

Furthermore an engine which can be throttled or controlled so that the speed is reduced during said "off periods," the same will perform its functions without heating up unduly, as might be the case where it is run continually with a wide open throttle. By reducing the fuel fed to the engine during the "off periods" the engine is in a position to carry heavier loads during the "on periods."

My invention will be readily understood by referring to the annexed drawing wherein Figure 1, is a diagrammatic view illustrating an arc welding system operated by an internal combustion engine.

Figure 2, shows the arc welding circuit per se, the controlling mechanism being different than that shown in Figure 1.

Figure 3, is a further modified form and Figure 4 illustrates still another means of control, and Fig. 5 is still another form.

In the various figures, 1 and 2, illustrate the terminals of a generator adapted to supply current to the arc welding circuit, and for the purpose of illustration I have shown these terminals as being the terminals of a direct current generator, although it is to be understood that alternating current may be used with the other necessary modifications to accommodate its use. 3 is an internal combustion engine having the usual intake manifold 4, and exhaust manifold 5, and carburetor 6. The manifold 4 is provided with a throttle valve 7. Connected to the throttle valve 7, is a lever 8, which is connected by any satisfactory means 9 to a plunger 10 of solenoid 11. The solenoid 11 as shown in Figure 1, has a series winding connected at one end by the wire 12 to the terminal 2, and by wire 13 to a handle 14, carrying an electrode 15, the work on which welding is to be performed being indicated at 16, and connected by wire 17 to the terminal 1. The solenoid 11 may be provided by a dash pot or buffer spring 18, which acts to prevent any overdraw of the plunger 10, as it is drawn into the solenoid when current passes through the welding circuit at the time of striking the arc. Some means, such as a spring 19 is provided to normally hold the throttle 7, in substantially closed position, at the same time holding the plunger 10 in position to be actuated by the series winding of the solenoid 11.

It will be understood from what has been said that with the welding circuit open the throttle 7 is in a position to throttle the engine so that it operates at a much lower speed than the full load running speed, but still operating the generator at sufficient speed to produce voltage enough to force the necessary current through the solenoid 11 to open the throttle 7, when it is desired to strike the arc to start the welding operations, by touching the electrode to the work the throttle 7 is immediately opened and the engine speeds up, raising the voltage on the generator to its normal welding voltage. On stopping the welding operation, either by the accidental extinguishing of the arc or consummation of the electrode, or for any other reason the arc is stopped and the engine automatically slowed down.

In Figure 2, the solenoid 11 is provided with a series winding 20, and a fine or shunt winding 21. The shunt winding 21 is connected to back contacts 22 and a contact member 23, attached to or actuated by the plunger 10. The handle 14 is provided with a contact member 24 and 25, so that when it is desired to start welding operations the contact 25 is pushed into engagement with the contact 24, by the welding operator, and this provides current to the shunt winding 21 which is of sufficient strength to actuate the plunger 10, sufficiently to start opening the throttle 7 of the engine, causing it to speed up and the voltage on the generator to increase and the plunger 10, is then held in fully operative position by the current through the series winding 20, which current passes through the arc welding circuit.

I preferably make the contacts 22 and 23 of such a nature that there is considerable follow-up motion during the instant of starting up.

In Figure 3, the solenoid 11 is provided with a series winding 20, and two shunt windings 21 and 26. The windings 20 and 21 both function together to operate the engine throttle, and the winding 21 can be opened at the contacts 24 and 25 after the arc has been started. The winding 26 may be utilized to assist the series winding in holding the plunger 10 in fully operative position through the medium of the contacts 27 and 28, which are closed on actuation of the plunger 10, on starting the welding operations.

In the form shown in Figure 4, the solenoid 11 is provided with a shunt winding of sufficient strength to actuate the plunger 10 at the slow speed of the engine. In this case the contacts 24 and 25 are held in closed position by any suitable kind of a push button at the welding handle, and the engine is thus controlled without the arc being in actual operation.

In Figure 5 the relay is provided with series and shunt windings 20 and 21, the shunt winding 21 being more readily responsive to the low voltage of the generator than the winding 20. After the engine throttle has been opened by the actuation of the plunger 10, contacts 27 and 28 are separated and the winding 21 is then opened, the series winding 20, holding the plunger 10 in actuated position.

From the various methods indicated, it is obvious that there are many ways of putting my invention into operation by various forms of relays, and methods of operating the same, and I therefore do not wish to be unduly limited in the interpretation of the appended claims.

Having thus described my invention, what I claim is:

1. In an arc welding system including in combination with a movable handle adapted to be used by an operator for manual arc welding, a welding electrode carried by the handle and a source of welding current adapted to be connected to the electrode; an internal combustion engine having a throttle control for actuating said source of current, means comprising a relay having a movable part connected to said engine throttle to open the same when the operator desires to do welding by manipulation of the welding handle, and a pair of contacts actuated by the relay, said relay having a plurality of windings, one winding being relatively heavy and connected to the source of current and to the electrode to carry the arc circuit current, and another finer winding normally connected in shunt to the first mentioned winding and including said contacts in its circuit, the said windings of the relay being brought into use by the operator on manipulation of the handle preparatory to striking an arc by the electrode, said second mentioned winding being removed from circuit on separation of said contacts by actuation of the relay by its windings.

2. In an arc welding system including in combination with a movable handle adapted to be used by an operator for manual arc welding, a welding electrode carried by the handle and a source of welding current adapted to be connected to the electrode; an internal combustion engine having a throttle control for actuating said source of current, means including a relay having a movable part connected to said engine throttle to open the same to speed up the engine for the purposes described, said relay having windings brought into operation by the welding operator on manipulation of the welding handle preparatory to striking an arc by the electrode, one of said windings being connected in series in the arc circuit, another of said windings being normally connected in shunt to the first mentioned winding and at least assisting the first mentioned winding in operating the relay to actuate said movable part to open the engine throttle, and means at the engine for moving the throttle to closed position when said relay windings are de-energized by the welding operator in the manipulation of said welding handle.

In testimony whereof, I affix my signature.

CLAUDE J. HOLSLAG.